United States Patent
Pritchard et al.

(10) Patent No.: US 10,094,457 B2
(45) Date of Patent: *Oct. 9, 2018

(54) ELECTRIC ALL-WHEEL DRIVE TWO SPEED WITH SPLIT DOUBLE REDUCTION PLANETARY

(71) Applicant: BorgWarner Inc., Auburn Hills, MI (US)

(72) Inventors: Larry A. Pritchard, Macomb, MI (US); Thaddeus R. Kopp, Oakland Township, MI (US); David E. Young, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,873

(22) Filed: Mar. 8, 2017

(65) Prior Publication Data
US 2017/0261082 A1 Sep. 14, 2017

Related U.S. Application Data

(60) Provisional application No. 62/307,743, filed on Mar. 14, 2016.

(51) Int. Cl.
*F16H 3/78* (2006.01)
*F16H 37/08* (2006.01)
(Continued)

(52) U.S. Cl.
CPC ....... *F16H 37/0813* (2013.01); *B60K 7/0007* (2013.01); *B60K 17/08* (2013.01);
(Continued)

(58) Field of Classification Search
CPC ...... F16H 37/0813; F16H 37/082; F16H 3/78; F16H 3/66; F16H 2200/2007;
(Continued)

(56) References Cited

U.S. PATENT DOCUMENTS 8,663,051 B2 * 3/2014 Sten .................. F16H 48/36
475/150
9,453,564 B1 * 9/2016 Pritchard ............. B60K 17/346
(Continued)

OTHER PUBLICATIONS

Pritchard et al., U.S. Appl. No. 15/444,831 "Electric All-Wheel Drive Two Speed With Split Double Reduction Planetary", Mar. 6, 2017.

*Primary Examiner* — Roger L Pang
(74) *Attorney, Agent, or Firm* — BrooksGroup

(57) ABSTRACT

A number of variations may include a product comprising an electrical machine operatively connected to a driveline module comprising a gear train having a fixed gear ratio, a first planetary gear set having multiple gear ratios operatively connected to the gear train, a second planetary gear set having a fixed gear ratio operatively connected to the first planetary gear set, and a synchronizer operatively connected to the first planetary gear set and which is positioned between the first and second planetary gear set; a differential operatively connected to the second planetary gear set; wherein the electrical machine selectively transmits power to the differential through the gear train, first planetary gear set, synchronizer, and second planetary gear set, and wherein the synchronizer is constructed and arranged to shift the driveline module into a high, low, and a neutral mode through placement of a ring gear of the first planetary gear set.

15 Claims, 1 Drawing Sheet

(51) Int. Cl.
*F16H 3/66* (2006.01)
*B60K 17/08* (2006.01)
*B60K 17/16* (2006.01)
*B60K 17/22* (2006.01)
*B60K 7/00* (2006.01)

(52) U.S. Cl.
CPC .............. *B60K 17/16* (2013.01); *B60K 17/22* (2013.01); *F16H 3/66* (2013.01); *F16H 3/78* (2013.01); *B60K 2007/0061* (2013.01); *F16H 37/082* (2013.01); *F16H 2200/0034* (2013.01); *F16H 2200/2007* (2013.01)

(58) Field of Classification Search
CPC .......... F16H 2200/0034; B60K 7/0007; B60K 17/16; B60K 17/08; B60K 17/22; B60K 2007/0061
USPC ....... 475/150, 151, 200, 203, 204, 205, 303, 475/320
See application file for complete search history.

(56) References Cited

U.S. PATENT DOCUMENTS

| | | | |
|---|---|---|---|
| 9,841,092 B2* | 12/2017 | Wenthen | F16H 37/0813 |
| 2006/0281597 A1* | 12/2006 | Williams | B60K 17/344 475/198 |
| 2017/0248213 A1* | 8/2017 | Peters | F16H 37/086 |
| 2017/0254396 A1* | 9/2017 | Pritchard | B60K 17/08 |

\* cited by examiner

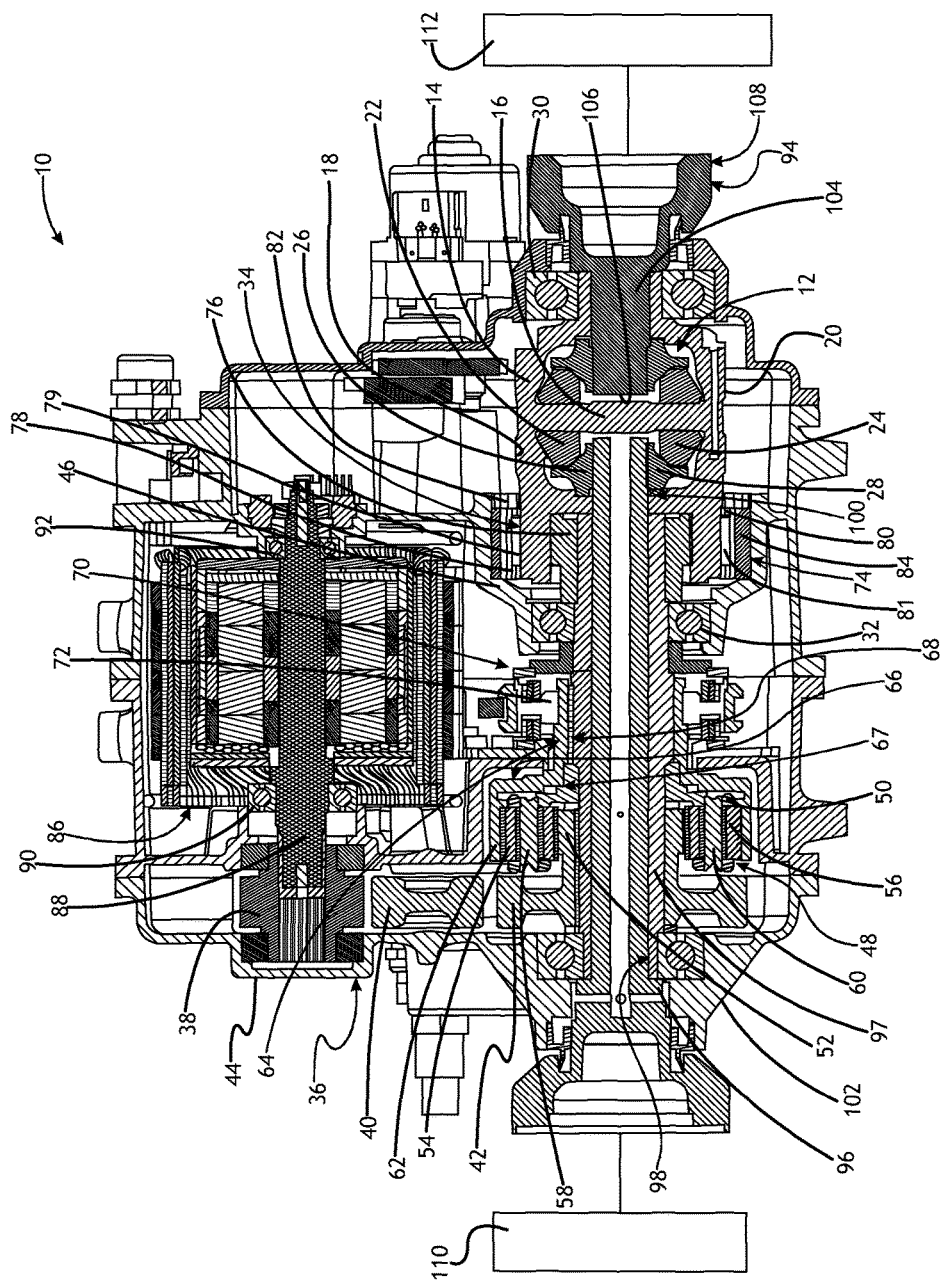

ELECTRIC ALL-WHEEL DRIVE TWO SPEED WITH SPLIT DOUBLE REDUCTION PLANETARY

CROSS-REFERENCE TO RELATED APPLICATIONS

This application claims the benefit of U.S. Provisional Application Ser. No. 62/307,743 filed Mar. 14, 2016.

TECHNICAL FIELD

The field to which the disclosure generally relates to includes vehicle powertrains.

BACKGROUND

A vehicle powertrain may include at least one driveline which may drive the vehicle.

SUMMARY OF ILLUSTRATIVE VARIATIONS

A number of variations may include a product comprising: an electrical machine operatively connected to a driveline module comprising a gear train having a fixed gear ratio, a first planetary gear set having multiple gear ratios operatively connected to the gear train, a second planetary gear set having a fixed gear ratio operatively connected to the first planetary gear set, and a synchronizer, wherein the synchronizer is operatively connected to the first planetary gear set and is positioned between the first planetary gear set and the second planetary gear set; a differential operatively connected to the second planetary gear set; wherein the electrical machine selectively transmits power to the differential through the gear train, the first planetary gear set, the synchronizer, and the second planetary gear set, and wherein the synchronizer is constructed and arranged to shift the driveline module into a high range mode, a low range mode, and a neutral mode through placement of a ring gear of the first planetary gear set.

A number of variations may include a product comprising an electrical machine operatively connected to a driveline module, and an axle assembly having a centerline support shaft operatively connected to the driveline module, wherein the driveline module comprises a helical gear train, a first helical planetary gear set operatively connected to the helical gear train, a synchronizer operatively connected to the first helical planetary gear set, and a second helical planetary gear set adjacent the synchronizer and operatively connected to the first helical planetary gear set and the axle assembly; and wherein the synchronizer is constructed and arranged to shift a first ring gear of the first helical planetary gear set to shift the driveline module to a high range mode, a neutral mode, and a low range mode.

A number of variations may include a method of driving an axle differential comprising: selectively driving an electrical machine having a rotatable shaft; driving a helical gear train operatively connected to the rotatable shaft using the electrical machine; providing output from the helical gear train to a first helical planetary gear set having a sun gear, at least two planetary gears, a ring gear, and a carrier; shifting the ring gear to a first position to ground the ring gear to a housing to achieve a low range mode using a synchronizer or shifting the ring gear to a second position connecting the ring gear to the carrier through a centerline support shaft to achieve a high range mode using the synchronizer; driving a second helical planetary gear set with output from the first planetary gear set and the synchronizer; and driving the differential with output from the second helical planetary gear set.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a cross-section of a driveline module according to a number of variations.

DETAILED DESCRIPTION OF ILLUSTRATIVE VARIATIONS

The following description of the variations is merely illustrative in nature and is in no way intended to limit the scope of the invention, its application, or uses.

In a number of variations, a vehicle may include a driveline module 10 which may transfer power to a differential 12. Referring to FIG. 1, in a number of variations, a driveline module 10 may transfer power through a gear train 36, a first planetary gear set 48, a synchronizer 70, and a second planetary gear set 74 through to the differential 12. In a number of variations, the gear train 36 may provide a fixed gear ratio while the first planetary gear set 48 may provide multiple gear ratios so that the driveline module 10 may provide a low range, a neutral range, and a high range between an electrical machine 86 and an axle assembly 94. In a number of variations, power may be transferred through the driveline module 10 so that the electrical machine 86 drives the axle assembly 94 such as for propulsion. Power may also be transferred through the driveline module 10 so that the axle assembly 94 drives the electrical machine 86, such as for regenerative braking.

In a number of variations, an axle assembly 94 may extend through the driveline module 10 and may be operatively attached to a first wheel 110 and a second wheel 112. Any number of axle assembly configurations may be used including, but not limited to, axle assemblies including constant velocity joints and other common components known to those skilled in the art. In a number of variations, an axle assembly 94 may include a first axle shaft 96, a centerline support shaft 97 which may be concentric with the first axle shaft 96 and may surround a portion of the first axle shaft 96, a second axle shaft 104, and a differential 12. The centerline support shaft 97 may be hollow and may include a first end 98 and a second end 100. In a number of variations, the first end 98 may be supported in a first bearing 102. In a number of variations, the second axle shaft 104 may include a first end 106 and a second end 108.

In a number of variations, a differential 12 may be operatively attached to the first and second axle shafts 96, 104 and may comprise a cage 14 and a pinion shaft 16 which may extend between a first end 18 of the cage 14 and a second end 20 of the cage 14. In a number of variations, a first pinion gear 22 and a second pinion gear 24 may be rotatably attached to the pinion shaft 16. A first side gear 26 may engage the first pinion gear 22 and a second side gear 28 may engage the second pinion gear 24. In a number of variations, the cage 14 may be carried by a first and second bearing 30, 32 and may be rotatable. In a number of variations, the second planetary gear set 74 may be positioned within the cage 14. A first side 34 of the cage 14 may be connected to or may be integral with a carrier 82 of the second planetary gear set 74, and may rotate with the carrier 82.

In a number of variations, the cage 14 may be rotated which may cause the first and second pinion gears 22, 24 and the first and second side gears 26, 28 to rotate which may cause the first axle shaft 96 and the second axle shaft 104 to drive the first and second wheel 110, 112, respectively. In a number of variations, input may be provided from the first wheel 110 and the second wheel 112, such as for regenerative braking, which may cause the first and second axle shafts 96, 104 to rotate the first and second side gears 26, 28, which may cause the first and second pinion gears 22, 24 to rotate, which may rotate the cage 14.

In a number of variations, an electrical machine 86 may be operatively connected to the driveline module 10 and may provide power to the axle assembly 94 through the driveline module 10 and the differential 12. Any number of electrical machines 86 may be used including, but not limited to, a motor, a motor-generator, or another type of electrical machine. In a number of variations, a shaft 88 including, but not limited to, a rotor shaft may extend from the electrical machine 86 and may be supported by a first and second bearing 90, 92. In a number of variations, a housing 44 may surround at least a portion of the electrical machine 86, the driveline module 10, and the differential 12. The housing 44 may comprise a single continuous component or may comprise two or more separate components. In a number of variations, the housing 44 may be constructed and arranged to contain a lubricant including, but not limited to, oil.

In a number of variations, the shaft 88 from the electrical machine 86 may be operatively connected to the gear train 36. In a number of variations, the gear train 36 may comprise helical gears. The gear train 36 may be used to provide input to and output from the electrical machine 86. In a number of variations, the gear train 36 may comprise a first gear 38 which may be operatively attached to the shaft 88 and may rotate with the shaft 88. The first gear 38 may engage and may rotate with a second gear 40. The second gear 40 may comprise a diameter greater than the first gear 38 which may provide a reduction therebetween from the shaft 88. The second gear 40 may engage and may rotate with a third gear 42. In a number of variations, the second gear 40 may be an idler gear which may be engaged between the first gear 38 and the third gear 42 and may rotate about a center that may be offset behind the plane of the view in FIG. 1. This may allow the shaft 88 to be positioned close to the first axle shaft 96 which may minimize the space between the first and third gears 38, 42 reducing packaging space. In a number of variations, the use of a helical gear train may provide ease of lubrication at high speed as the gears 38, 40, 42 may be larger and more open than other gear types.

In a number of variations, the first, second, and third gears 38, 40, 42 may rotate around a parallel axes. In a number of variations, the electrical machine 86 may drive the gear train 36 so that the first gear 38 may be an input gear, the second gear 40 may be an intermediate gear, and the third gear 42 may be an output gear. In a number of variations, the electrical machine 86 may be driven by the axle assembly 94 so that the third gear 42 may then be an input gear, the second gear 40 may be the intermediate gear, and the first gear 38 may be the output gear.

In a number of variations, the third gear 42 may be operatively connected to a sun gear 52 of the first planetary gear set 48. The third gear 42 and the sun gear 52 may be operatively attached so that the third gear 42 and the sun gear 52 may rotate together. In a number of variations, the sun gear 52 may freely rotate on the centerline support shaft 97. In a number of variations, the sun gear 52 may be rotatably connected to a first planetary gear 54 and a second planetary gear 56 so that the first planetary gear 54 and the second planetary gear 56 rotate with the sun gear 52. The first planetary gear 54 may rotate on a first pin 58 which may be fixed to a carrier 50 and the second planetary gear 56 may rotate on a second pin 60 which may also be fixed to the carrier 50. It is noted that more than two planetary gears may be used depending on design requirements. The first planetary gear 54 and the second planetary gear 56 may engage and rotate within an annulus or ring gear 62 which may include internal teeth. In a number of variations, the ring gear 62 may also include a hub 64 which may include a first portion 66 which may extend radially toward the centerline support shaft 97 and a second portion 68 which may extend axially from the end 67 of the first portion 66. In a number of variations, the ring gear hub 64 may be constructed and arranged to engage with the synchronizer 70, as will be discussed hereafter. The first planetary gear set 48 may comprise any number of types of gears including, but not limited to, helical gears. In a number of variations, the sun gear 52 may be rotated which may cause the first and second planetary gears 54, 56 to rotate within the inside of the ring gear 62 which may cause the carrier 50 to rotate.

Any number of types of synchronizers 70 may be used in the driveline module 10 which may allow for shifting of the driveline module 10. In a number of variations, the synchronizer 70 may comprise a synchronizer hub 72. The synchronizer hub 72 may be constructed and arranged to engage the ring gear hub 64 of the first planetary gear set 48 so that the synchronizer hub 72 may move the ring gear 62 axially with the synchronizer hub 72. In a number of variations, range selection may be performed by an actuator (not illustrated), which may move the synchronizer hub 72 axially in relation to the centerline support shaft 97. The synchronizer 70 may selectively disconnect the differential 12 from the electrical machine 86 to provide a neutral mode, and may connect the electrical machine 86 with the differential 12 to provide two operative modes of power transmission.

In a number of variations, the synchronizer hub 72 may be selectively shifted to the left (in the perspective view of FIG. 1) which may cause the ring gear 62 of the first planetary gear set 48 to shift so that the ring gear 62 may be grounded to the housing 44 so that it may be fixed from rotation. When the ring gear 62 may be grounded, rotational speed of the carrier 50 of the first planetary gear set 48 may be reduced and torque may be increased so that the driveline module 10 may be performing in a low range mode of operation. In a number of variations, the synchronizer hub 72 may also be selectively shifted to the right (in the perspective view of FIG. 1) which may cause the ring gear 62 of the first planetary gear set 48 to shift so that the ring gear 62 may be operatively connected to the carrier 50 of the first planetary gear set 48 so that it may rotate with the carrier 50 which may be operatively connected to the centerline support shaft 97. When the ring gear 62 may be connected to the carrier 50 through the centerline support shaft 97, rotational speed of the sun gear 52 may be maintained so that the driveline module 10 may be performing in a high range mode of operation.

In a number of variations, the output from the first planetary gear set 48 may be transferred to the second planetary gear set 74 which may drive the differential 12. The second planetary gear set 74 may include a sun gear 76, a first and second planetary gear 78, 80 which may each be attached to a carrier 82 through a first and second pin 79, 81, respectively, and a ring gear 84 which may include internal teeth. It is noted that more than two planetary gears may be used depending on design requirements. In a number of variations, the ring gear 84 of the second planetary gear set 74 may be grounded to the housing 44 at an extending annular wall 46 so that it may be fixed from rotation. The second planetary gear set 74 may be fixed to operate in a low range mode. The second planetary gear set 74 may comprise any number of types of gears including, but not limited to, helical gears.

In a number of variations, the synchronizer hub 72 may be actuated by any number of actuators known in the art including, but not limited to, electromechanical, electromagnetic, and/or hydraulics. In a number of variations, the position of the synchronizer 70 between the first planetary gear set 48 and the second planetary gear set 74 may lower the reflected inertia at the synchronizer 70.

In a number of variations, one or more features may be incorporated into the driveline module 10 which may manage sump level and reduce shear losses such as disclosed in patent application Ser. No. 14/824,724 which is herein incorporated by reference.

According to the above variations, a vehicle may be provided with an axle assembly 94 which may be driven by an electrical machine 86 which may provide electric all-wheel drive. In a number of variations, the vehicle may be equipped with a second axle assembly which may be driven by a conventional power plant to accomplish all-wheel drive. The first axle assembly 94 may drive the electrical machine 86 which may allow regenerative braking to charge the vehicle's battery. In a number of variations, the first axle assembly 94 may be driven by the electrical machine 86 which may improve traction and vehicle dynamics. The first axle assembly 94 may provide electric drive with improved torque in a low voltage system including, but not limited to, a 48 volt system. The first axle assembly 94 may be in any number of positions in a vehicle including, but not limited to, the rear axle in a front-wheel drive vehicle or the front axle in a rear-wheel drive vehicle.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an electrical machine operatively connected to a driveline module comprising a gear train having a fixed gear ratio, a first planetary gear set having multiple gear ratios operatively connected to the gear train, a second planetary gear set having a fixed gear ratio operatively connected to the first planetary gear set, and a synchronizer, wherein the synchronizer is operatively connected to the first planetary gear set and is positioned between the first planetary gear set and the second planetary gear set; a differential operatively connected to the second planetary gear set; wherein the electrical machine selectively transmits power to the differential through the gear train, the first planetary gear set, the synchronizer, and the second planetary gear set, and wherein the synchronizer is constructed and arranged to shift the driveline module into a high range mode, a low range mode, and a neutral mode through placement of a ring gear of the first planetary gear set.

Variation 2 may include a product as set forth in Variation 1 wherein the synchronizer further comprises a synchronizer hub and wherein the synchronizer hub is operatively attached to the ring gear, and wherein the synchronizer is constructed and arranged to shift the synchronizer hub to move the ring gear to a first position to ground the ring gear to the driveline module to achieve the low range mode, to a second position to operably connect the ring gear to a carrier of the first planetary gear set to achieve the high range mode, and to a third position where the ring gear is not grounded and not connected to the carrier of the first planetary gear set to achieve the neutral mode.

Variation 3 may include a product as set forth in any of Variations 1-2 wherein the gear train comprises a first gear operatively connected to the electrical machine, a second gear operatively connected to the first gear, and a third gear operatively connected to the second gear and a sun gear of the first planetary gear set.

Variation 4 may include a product as set forth in any of Variations 1-3 wherein the gear train comprises helical gears.

Variation 5 may include a product as set forth in any of Variations 1-4 wherein the first planetary gear set and the second planetary gear set comprise helical gears.

Variation 6 may include a product as set forth in any of Variations 1-5 wherein an axle shaft assembly extends through the gear train, the first planetary gear set, the synchronizer, the second planetary gear set, and the differential.

Variation 7 may include a product comprising an electrical machine operatively connected to a driveline module, and an axle assembly having a centerline support shaft operatively connected to the driveline module, wherein the driveline module comprises a helical gear train, a first helical planetary gear set operatively connected to the helical gear train, a synchronizer operatively connected to the first helical planetary gear set, and a second helical planetary gear set adjacent the synchronizer and operatively connected to the first helical planetary gear set and the axle assembly; and wherein the synchronizer is constructed and arranged to shift a first ring gear of the first helical planetary gear set to shift the driveline module to a high range mode, a neutral mode, and a low range mode.

Variation 8 may include a product as set forth in Variation 7 wherein the synchronizer further comprises a synchronizer hub, and wherein in the high range mode the synchronizer hub connects the ring gear of the first helical planetary gear set to a carrier of the first helical planetary gear set through the centerline support shaft, wherein in the low range mode the synchronizer hub grounds the ring gear of the first helical planetary gear set to the drive module, and wherein in the neutral mode the synchronizer hub disconnects the electrical machine from the axle assembly.

Variation 9 may include a product as set forth in any of Variations 7-8 wherein the axle assembly further comprises a first axle shaft which extends through the centerline support shaft, a second axle shaft, and a differential between the first axle shaft and the second axle shaft, and wherein the second helical planetary gear set is operatively connected to the differential.

Variation 10 may include a product as set forth in any of Variations 7-9 further comprising a housing, wherein the housing surrounds at least a portion of the electrical machine, the driveline module, and the axle assembly.

Variation 11 may include a product as set forth in Variation 10 wherein the housing is constructed and arranged to contain a lubricant.

Variation 12 may include a product as set forth in any of Variations 7-11 wherein the first helical planetary gear set comprises a sun gear, at least two planetary gears which are rotatably attached to a carrier and which engage with and are rotated by the sun gear, and the first ring gear, and wherein the at least two planetary gears rotate within the first ring gear.

Variation 13 may include a product as set forth in any of Variations 7-12 wherein the second helical planetary gear set comprises a sun gear, at least two planetary gears which are rotatably attached to a carrier and which engage with and are rotated by the sun gear, and a second ring gear, wherein the at least two planetary gears rotate within the second ring gear, and wherein the second ring gear is grounded.

Variation 14 may include a method of driving an axle differential comprising: selectively driving an electrical machine having a rotatable shaft; driving a helical gear train operatively connected to the rotatable shaft using the electrical machine; providing output from the helical gear train to a first helical planetary gear set having a sun gear, at least two planetary gears, a ring gear, and a carrier; shifting the ring gear to a first position to ground the ring gear to a housing to achieve a low range mode using a synchronizer or shifting the ring gear to a second position connecting the ring gear to the carrier through a centerline support shaft to achieve a high range mode using the synchronizer; driving a second helical planetary gear set with output from the first planetary gear set and the synchronizer; and driving the differential with output from the second helical planetary gear set.

Variation 15 may include a method as set forth in Variation 14 further comprising shifting the ring gear to a third position to disconnect the electrical machine from the differential using the synchronizer.

The above description of select variations within the scope of the invention is merely illustrative in nature and, thus, variations or variants thereof are not to be regarded as a departure from the spirit and scope of the invention.

What is claimed is:

1. A product comprising: an electrical machine operatively connected to a driveline module comprising a gear train having a fixed gear ratio, a first planetary gear set having multiple gear ratios operatively connected to the gear train, a second planetary gear set having a fixed gear ratio operatively connected to the first planetary gear set, and a synchronizer, wherein the synchronizer is operatively connected to the first planetary gear set and is positioned between the first planetary gear set and the second planetary gear set; a differential operatively connected to the second planetary gear set; wherein the electrical machine selectively transmits power to the differential through the gear train, the first planetary gear set, the synchronizer, and the second planetary gear set, and wherein the synchronizer is constructed and arranged to shift the driveline module into a high range mode, a low range mode, and a neutral mode through placement of a ring gear of the first planetary gear set.

2. The product of claim 1 wherein the synchronizer further comprises a synchronizer hub and wherein the synchronizer hub is operatively attached to the ring gear, and wherein the synchronizer is constructed and arranged to shift the synchronizer hub to move the ring gear to a first position to ground the ring gear to the driveline module to achieve the low range mode, to a second position to operably connect the ring gear to a carrier of the first planetary gear set to achieve the high range mode, and to a third position where the ring gear is not grounded and not connected to the carrier of the first planetary gear set to achieve the neutral mode.

3. The product of claim 1 wherein the gear train comprises a first gear operatively connected to the electrical machine, a second gear operatively connected to the first gear, and a third gear operatively connected to the second gear and a sun gear of the first planetary gear set.

4. The product of claim 1 wherein the gear train comprises helical gears.

5. The product of claim 1 wherein the first planetary gear set and the second planetary gear set comprise helical gears.

6. The product of claim 1 wherein an axle shaft assembly extends through the gear train, the first planetary gear set, the synchronizer, the second planetary gear set, and the differential.

7. A product comprising an electrical machine operatively connected to a driveline module, and an axle assembly having a centerline support shaft operatively connected to the driveline module, wherein the driveline module comprises a helical gear train, a first helical planetary gear set operatively connected to the helical gear train, a synchronizer operatively connected to the first helical planetary gear set, and a second helical planetary gear set adjacent the synchronizer and operatively connected to the first helical planetary gear set and the axle assembly; and wherein the synchronizer is constructed and arranged to shift a first ring gear of the first helical planetary gear set to shift the driveline module to a high range mode, a neutral mode, and a low range mode.

8. The product of claim 7 wherein the synchronizer further comprises a synchronizer hub, and wherein in the high range mode the synchronizer hub connects the ring gear of the first helical planetary gear set to a carrier of the first helical planetary gear set through the centerline support shaft, wherein in the low range mode the synchronizer hub grounds the ring gear of the first helical planetary gear set to the drive module, and wherein in the neutral mode the synchronizer hub disconnects the electrical machine from the axle assembly.

9. The product of claim 7 wherein the axle assembly further comprises a first axle shaft which extends through the centerline support shaft, a second axle shaft, and a differential between the first axle shaft and the second axle shaft, and wherein the second helical planetary gear set is operatively connected to the differential.

10. The product of claim 7 further comprising a housing, wherein the housing surrounds at least a portion of the electrical machine, the driveline module, and the axle assembly.

11. The product of claim 10 wherein the housing is constructed and arranged to contain a lubricant.

12. The product of claim 7 wherein the first helical planetary gear set comprises a sun gear, at least two planetary gears which are rotatably attached to a carrier and which engage with and are rotated by the sun gear, and the first ring gear, and wherein the at least two planetary gears rotate within the first ring gear.

13. The product of claim 7 wherein the second helical planetary gear set comprises a sun gear, at least two planetary gears which are rotatably attached to a carrier and which engage with and are rotated by the sun gear, and a second ring gear, wherein the at least two planetary gears rotate within the second ring gear, and wherein the second ring gear is grounded.

14. A method of driving an axle differential comprising:
selectively driving an electrical machine having a rotatable shaft;
driving a helical gear train operatively connected to the rotatable shaft using the electrical machine;
providing output from the helical gear train to a first helical planetary gear set having a sun gear, at least two planetary gears, a ring gear, and a carrier;
shifting the ring gear to a first position to ground the ring gear to a housing to achieve a low range mode using a synchronizer or shifting the ring gear to a second position connecting the ring gear to the carrier through a centerline support shaft to achieve a high range mode using the synchronizer;
driving a second helical planetary gear set with output from the first planetary gear set and the synchronizer; and
driving the differential with output from the second helical planetary gear set.

15. The method of claim 14 further comprising shifting the ring gear to a third position to disconnect the electrical machine from the differential using the synchronizer.

* * * * *